United States Patent
Gutierrez (10) Patent No.: US 7,702,226 B1
(45) Date of Patent: Apr. 20, 2010

(54) BOARD MOUNTED HERMETICALLY SEALED OPTICAL DEVICE ENCLOSURE AND MANUFACTURING METHODS THEREFOR

(75) Inventor: Roman C. Gutierrez, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 612 days.

(21) Appl. No.: 11/490,196

(22) Filed: Jul. 20, 2006

(51) Int. Cl.
*G03B 17/08* (2006.01)
*H01L 21/00* (2006.01)

(52) U.S. Cl. .................... 396/25; 257/434; 438/121
(58) Field of Classification Search ............ 396/25; 348/81; 257/434; 438/121
See application file for complete search history.

(56) References Cited

U.S. PATENT DOCUMENTS

| | | | |
|---|---|---|---|
| 4,587,144 A | 5/1986 | Kellerman et al. | |
| 5,350,713 A * | 9/1994 | Liang | 438/106 |
| 5,407,119 A | 4/1995 | Churchill et al. | |
| 6,428,650 B1 * | 8/2002 | Chung | 156/250 |
| 6,674,143 B2 * | 1/2004 | Tatoh et al. | 257/434 |
| 6,674,159 B1 * | 1/2004 | Peterson et al. | 257/680 |
| 6,686,580 B1 * | 2/2004 | Glenn et al. | 250/208.1 |
| 7,358,106 B2 * | 4/2008 | Potter | 438/51 |
| 2005/0184352 A1 * | 8/2005 | Jeong et al. | 257/432 |

* cited by examiner

*Primary Examiner*—W. B. Perkey
*Assistant Examiner*—Noam Reisner
(74) *Attorney, Agent, or Firm*—Haynes and Boone, LLP (57) ABSTRACT

An apparatus includes a planar member having a first planar surface, a hollow body having first and second end openings, and a window. The planar member is configured to receive a device mounted on the first planar surface and surrounded by at least a track of a first material having a first hardness affixed to the first planar surface. The hollow body has a sharp edge at the second end along a planar section of the hollow body. The hollow body comprises a second material with a second hardness equal to or greater than the first hardness. The window encloses the hollow body first end forming an enclosure interior region configured to surround the device. The window provides the transmission of light into or out of the interior region. The hollow body second end is urged against the first material to form a hermetically sealed enclosure around the device.

10 Claims, 7 Drawing Sheets

BOARD MOUNTED HERMETICALLY SEALED OPTICAL DEVICE ENCLOSURE AND MANUFACTURING METHODS THEREFOR

TECHNICAL FIELD

The field of invention relates generally to enclosures, and more particularly to a hermetically sealed enclosure for an optical device.

BACKGROUND

Traditional state-of-the-art miniature cameras for use cell phone applications are not typically suitable for operation in a highly humid or wet environment. The introduction of water into a traditional camera through splashed water, condensation, or immersion could degrade optical performance or even lead to the failure of electrical components. Even under exposure to moderate or non-condensing humidity, the durability or longevity of camera components including plastics and epoxies may be degraded. This degradation may also affect the performance of the optical device under shock conditions. Traditional solutions to the problem have been ineffective and costly.

Accordingly, there remains a need in the art for a cost-effective solution for operating a camera or other electro-optical device in highly humid or wet conditions.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Apparatuses and methods are disclosed to provide a hermetically sealed enclosure for an optical device mounted on a planar surface that is adapted for use in high humidity or wet conditions while providing a longer usable life for the optical device. One or more disclosed embodiments may reduce the impact of humidity and moisture upon non-moisture tolerant components and devices, especially optical devices, where the hermetically sealed enclosure protects the delicate optical device while still permitting operation. For the purposes of this disclosure, the term hermetic or the phrase hermetically sealed is defined to mean completely sealed against the escape or entry of foreign matter including gases or liquids.

Figure 1:
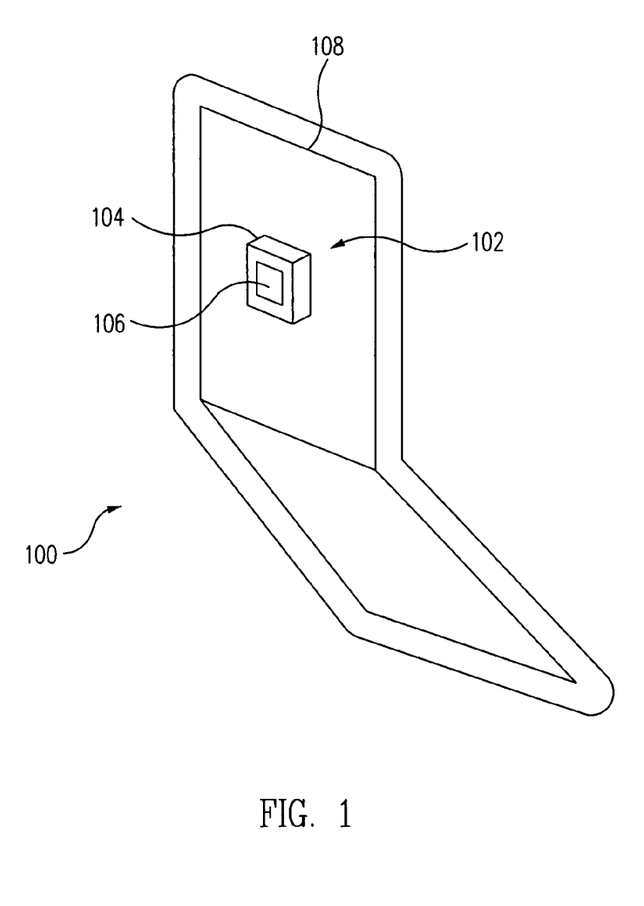
FIG. 1 shows a cell phone system including a hermetically sealed optical device enclosure having a square cross-section, in accordance with an embodiment of the present invention.

FIG. 1 shows a cell phone system 100 including a hermetically sealed optical device enclosure 102 having a square cross-section, in accordance with an embodiment of the present invention. Enclosure 102 may include a hollow body 104 and a window 106 where an interior region of enclosure 102 surrounds an optical device such as a camera mounted on a component board 108. Hollow body 104 may include any metal or metal alloy and may form an electromagnetic interference (EMI) shield for the interior region of enclosure 102. Since space apportioned within a cell phone system 100 or other electronic or electro-optical device may be defined as a cubic region or space, and since an imaging element may be square or rectangular in profile, enclosure 102 preferably has a substantially square or rectangular cross-section that may provide a more efficient use of available space. Enclosure 102 is shown having a substantially square cross section where adjacent sides of hollow body 104 have substantially equal lengths. Alternatively, enclosure 102 may have a rectangular cross-section where adjacent sides of hollow body 104 have unequal lengths. Other cross-sectional profiles are also possible, as will be further discussed below.

Figure 2:
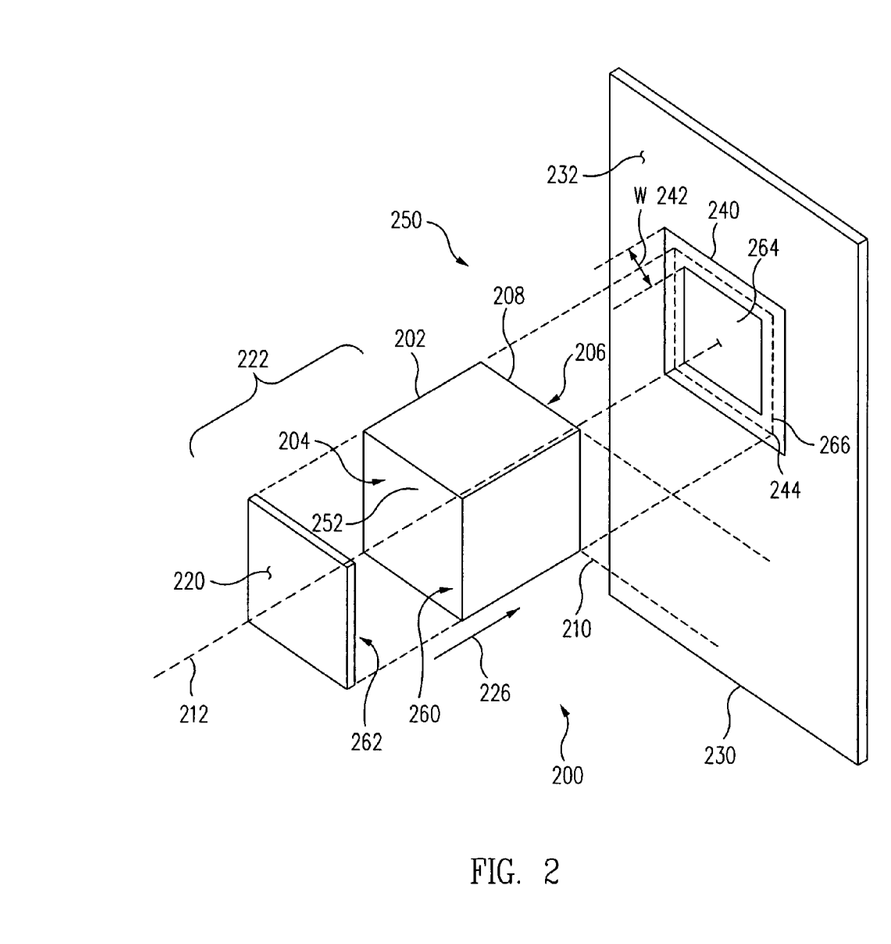
FIG. 2 shows an exploded perspective view of a hermetically sealed optical device enclosure having a square cross-section, in accordance with an embodiment of the present invention.

FIG. 2 shows an exploded perspective view of a hermetically sealed optical device enclosure 200 having a square cross-section, in accordance with an embodiment of the present invention. Enclosure 200 may include a hollow body 202 having openings on a first end 204 and a second end 206. Body 202 may be composed of any metal or metal alloy including plastic covered by metal such as copper, steel, aluminum, and nickel and alloys thereof. When the body 202 is a material coated with metal, the metal coating must be continuous with no gaps. Body 202 may include a sharp edge 208 formed along a planar section 210 of body 202 so that edge 208 is configured to mate with a planar surface. Planar section 210 is essentially a planar cut through hollow body 202 that is preferably normal to a long axis 212 of hollow body 202, but this is not considered limiting.

A transparent member or window 220 may enclose first end 204 in order to form a partial enclosure 222 that is open on only one face describing a hollow interior region configured to surround an optical device (not shown). Window 220 may be a light-passing or transmitting member such as a lens, a prism, a color filter, and/or a polarizing filter composed of a material such as glass, quartz, or crystal, that provides the transmission of light into and/or out of the interior region, including light emitted from and/or received by the optical device. In this manner, an enclosed optical device may operate within a hermetically sealed environment. In a preferred embodiment, window 220 is colorless and is configured to transmit light corresponding to an image into enclosure 200 and into a camera lens (not shown) that is oriented towards transparent member 220. In this embodiment, window 220 is shown as covering the entire first end 204. However, window 220 may cover only a portion of first end 204 while the remaining portion is covered by a continuation of body 202. Further, for an embodiment where only a portion of first end 204 is enclosed by window 220, the location of window 220 is preferably within a central region of first end 204. However, this is not considered limiting since window 220 may cover any portion of first end 204 in any pattern the may be located on any portion of first end 204. Depending on the configuration of the optical device, it may be necessary or desirable to limit the size of window 220 in some way.

Once window 220 is affixed to body 202 enclosing first end 204, the assembled partial enclosure 222 may be urged in a normal direction 226 towards and then against a planar member such as a component board 230 having a planar surface 232. Board 230 may be a planar member constructed from ceramic or other rigid material compatible with hermetic sealing. A track 240 of copper, flux-less solder, or other soft metallic material may be formed on surface 232 in an oversized shape encompassing the shape of section 210 of second end 206. In one embodiment, track 240 has a width W 242 centered about a fusing line 244 corresponding to the cross sectional profile of body 202 second end 206 and specifically of sharp edge 208, where width 242 may be measured at any point on the periphery of track 240. In this manner, as partial enclosure 222 is urged against track 240, sharp edge 208 "bites" into the material of track 240 to form a hermetically sealed enclosure 250 having an interior region 252 surrounded by an interior surface 260 of body 202, an interior surface 262 of window 220, a portion 264 of board 230, and a portion 266 of track 240 within the circumscribed boundary of sharp edge 208. In this manner, the urging of sharp edge 208 against track 240 to form the hermetic seal comprises a pressure or compression technique according to at least one embodiment of the present invention.

Body 202, or at least the portion of body 202 comprising sharp edge 208 may be composed of a first material having a first hardness. Similarly, track 240 may be composed of a second material having a second hardness, where the second hardness is substantially equal to or less than the first hardness. In this manner, the sharpness of edge 208 may be preserved and track 240 may yield or deform under the joining pressure and/or agitation from the small surface area of sharp edge 208 and be conformed to the shape of sharp edge 240 providing the hermetic seal. An optical device (not shown) may be mounted within an interior region of track 240 on the surface of board 230 so that the optical device is hermetically sealed by enclosure 250. In one alternative, the angle of planar section 210 may be tilted at an angle of up to ±20-degrees from normal in one or more embodiments so that a hermetically sealed enclosure 250 may be constructed having an angled junction with surface 232.

Figure 3:
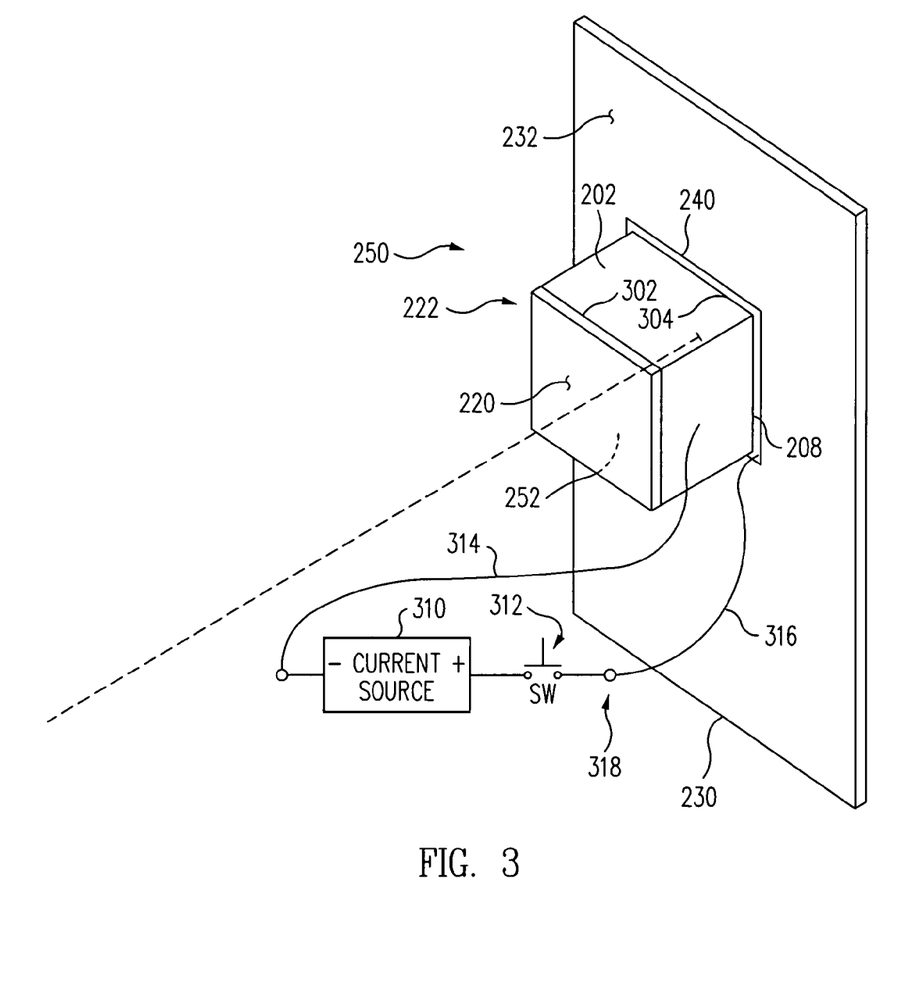
FIG. 3 shows the assembled hermetically sealed enclosure of FIG. 2, in accordance with an embodiment of the present invention.

FIG. 3 shows the assembled hermetically sealed enclosure 250 of FIG. 2, in accordance with an embodiment of the present invention. The boundary between window 220 and first end 204 forms a first junction 302, while the boundary between second end 206 and track 240 forms a second junction 304. A first method of forming the second junction 304 includes the pressure or compression method described above. A second method of forming second junction 304 includes a single-shot or electrical current flow welding method. A current source 310, a switch 312, a first current carrying lead 314, body 202, track 240, and a second current carrying lead 316 may be used to form an electrical circuit 318 when switch 312 is closed to provide a sufficiently high current across second junction 304 to melt at least a portion of sharp edge 208 and/or track 240 in order to form hermetically sealed enclosure 250. Current source 310 may be a sufficiently large capacitive device having a relatively short duty-cycle that is configured to store and release an electrical charge where the flow of electrical current during the release of electrical charge is sufficient to weld and/or fuse body 202 and track 240 forming a hermetic seal. When using single-shot welding, the hardness of track 240 may be substantially greater than, equal to, or less than the hardness of the edge 208. Preferably, track 240 may be composed of the same material as edge 208, so that the resulting weld may be stronger. Alternatively, edge 208 need not be sharp at the junction with track 240 when using the single-shot welding technique. However, having a sharp edge 208 may reduce the welding current requirement.

The large amount of current flowing through the circuit 318 may cause melting or fusing at the sharp edge where the contact cross-section is small since electrical resistance is correspondingly high. Alternatively, current source 310 may be a continuous or relatively long duty cycle that is configured to provide a flow of current that is similarly sufficient to weld and/or fuse body 202 and track 240 forming a hermetic seal. In this manner, current source 310 may supply a direct or alternating current. Switch 312 may be an actual user-operated switch or may be a computer controlled switch or other current flow controlling device configured to provide a current flow based on a current flow profile where the current flow profile is optimized for the particular body 202 and track 240 materials, or the current flow profile conforms to an optimal melting/fusing profile determined to provide an evenly welded second junction 304. In addition to providing a hermetic seal, a welded second junction 304 also provides a good electrical contact between the metal body 202 and the track 240 where body 202 comprises an electromagnetic interference (EMI) shield for one or more components or devices within interior region 252. For a traditional EMI enclosure not applied using a compression technique to form a hermetic seal according to an embodiment of the present invention, the electrical contact between the shield and a mounting board is typically made using solder in a time consuming process, but the electrical contact would still sometimes fail or be compromised due to physical shock.

A third, and optional, method of forming second junction 304 includes a combination of pressure in a joining direction coupled with agitation. In this manner, an agitation action, such as ultrasonic welding, may be performed to more completely fuse, attach, or seat sharp edge 208 with track 240 at second junction 304. One type of agitation action includes shaking of either partial enclosure 222 or board 230 to provide microscopically small relative movements while exerting a joining pressure or force at second junction 304. Another agitation action includes rotating either partial enclosure 222 or board 230 to provide microscopically small relative movements while exerting a joining pressure or force at second junction 304. The agitation of partial enclosure 222 while urging partial enclosure 222 against track 240 may cause the materials to more completely fuse or bind together, creating a strong hermetic seal at second junction 304.

Once the hermetically sealed enclosure is formed based on the urging of partial enclosure 222 against board 230, the structure of the seal may be reinforced by applying a reinforcing material to the junction between partial enclosure 222 and board 230 to prevent rupture. In one embodiment, the reinforcing material may be an epoxy applied to an outer portion of sharp edge 208 and an exposed portion of track 240. Alternatively, the reinforcing material may include a bead of solder or other low-temperature bonding material that may be applied to one or more locations, including as a continuous bead of solder around the external periphery of sharp edge 208. When using the single-shot welding technique to form the hermetic seal, application of a reinforcing material may be optional. It should be noted that the hermetically sealed enclosure is already formed prior to the application of the reinforcing materials.

Figure 4:
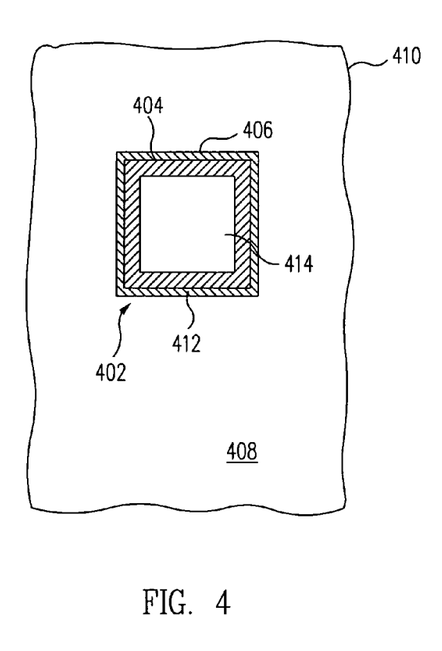
FIG. 4 shows a plan view of a hermetically sealed enclosure having a substantially square cross section, according to an embodiment of the present invention.

FIG. 4 shows a plan view of a hermetically sealed enclosure 402 having a substantially square cross section, according to an embodiment of the present invention. Enclosure 402 may be formed by pressing a partial enclosure 404 against a track 406 affixed to a surface 408 of a mounting board 410. As described, partial enclosure 404 may include a hollow body 412 and a window 414 configured to pass or transmit light. While partial enclosure 404 is shown having a rectangular prismatic shape with a substantially square cross section, this is not considered limiting. Alternatively, partial enclosure 404 may have an elliptical or ovoid cross section. In yet another alternative, partial enclosure 404 may have a circular, a regular polygonal cross-section, or an irregular polygonal cross-section having a polygonal (e.g. square, rectangular, pentagon, or hexagonal) profile.

Figure 5:
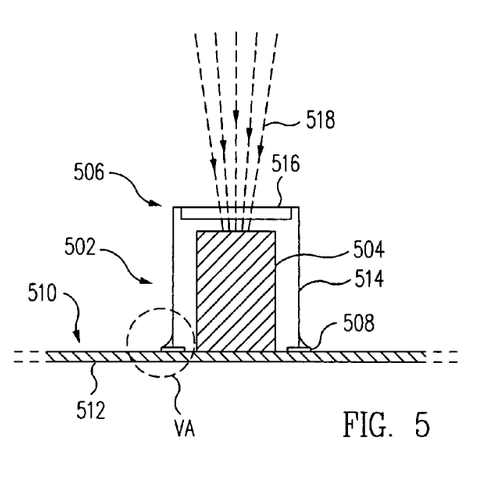
FIG. 5 shows a side view of a hermetically sealed enclosure for a camera, in accordance with an embodiment of the present invention.

FIG. 5 shows a side view of a hermetically sealed enclosure 502 for a camera 504, in accordance with an embodiment of the present invention. In a cell phone application, for example, enclosure 502 may provide a hermetic seal to protect a miniature camera mounted on a component board. In this manner, the cell phone would be usable in a highly humid or even a wet environment where the miniature camera is protected from exposure to water in vapor and/or liquid form. Enclosure 502 may include a gas under pressure, or else may be evacuated in order to provide a beneficial environment to the enclosed optical device. For example, an interior portion of enclosure 502 may include an inert gas that is not reactive under normal conditions. For example, argon gas may fill the interior portion of the hermetically sealed enclosure to prevent corrosion of the enclosed optical device. The hermetically sealed enclosure may also contain other noble or inert gases such as helium, neon, and xenon. Alternatively, an interior portion of enclosure 502 may include air under a standard pressure, a higher pressure, or a lower pressure. In the case of a lower pressure, the hermetically sealed enclosure may be evacuated or under vacuum in order to remove contaminants that may either corrode delicate components or otherwise degrade the performance of the optical device.

In one embodiment, hermetically sealed enclosure 502 is formed when partial enclosure 506 is fused with a portion of track 508 that is affixed to a surface 510 of a planar member such as a component board 512. Partial enclosure 506 comprises a body 514 and a window 516 where the junction between body 514 and window 516 is suitably sealed to prevent the passage of gas or liquids. Light 518 from an image scene may pass through window 516 and be converted into an image signal by camera 504. Conductors (not shown) may electrically connect camera 504 to an image processor (not shown). While camera 504 is shown within an inner region of enclosure 502, any sensing or projecting optical device may be enclosed therein. Other types of optical devices may include, a photodiode, a photocell, a photovoltaic device, a solid-state or complementary metal oxide semiconductor (CMOS) imager, a charge-coupled device (CCD), a thermal imager, a bolometer, photodetector, photomultiplier, laser emitter or receiver, liquid crystal display (LCD), digital micro-mirror device (DMD), microelectromechanical system (MEMS) device, a light emitting or detecting diode, and/or arrays of such optical devices. An isolated region VA identifies a portion of the hermetically sealed enclosure 502 including the junction between body member 514 and track 508.

Figure 6:
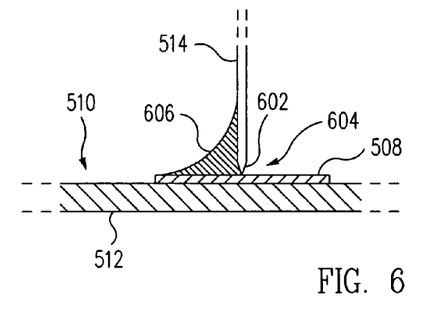
FIG. 6 shows a close up side view of the isolated region VA shown in FIG. 5, and illustrates an exemplary embodiment of a portion of the hermetically sealed enclosure in accordance with an embodiment of the present invention.

FIG. 6 shows a close up side view of the isolated region VA shown in FIG. 5, and illustrates an exemplary embodiment of a portion of the hermetically sealed enclosure 502 in accordance with an embodiment of the present invention. Body member 514 includes a sharp edge 602 (e.g. a razor edge) that may be urged or pressed against a portion of track 508 to form a hermetic seal 604. Once hermetic seal 604 is formed, a reinforcing material 606 may be applied to an exterior portion of the junction between body member 514 and track 508 to hold hermetic seal 604 in place against movement. Reinforcing material 606 may include either a continuous or a discontinuous bead. In another embodiment, reinforcing material may include solder (tin-lead) that is heated prior to flowing into the junction between body member 514 and track 508.

Figure 7:
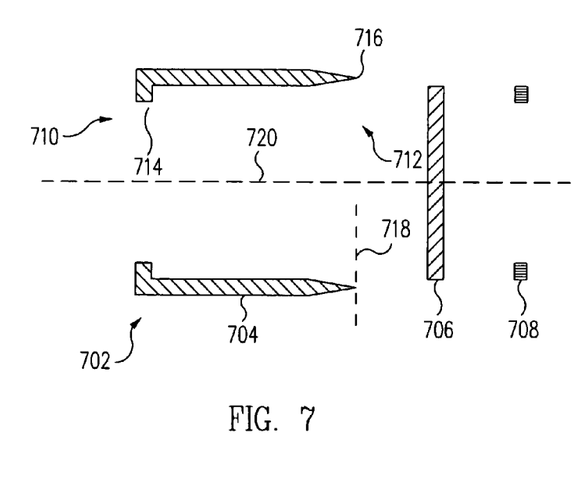
FIG. 7 shows an exploded side view of an exemplary embodiment of a partial enclosure, in accordance with an embodiment of the present invention.

FIG. 7 shows an exploded side view of an exemplary embodiment of a partial enclosure 702, in accordance with an embodiment of the present invention. Partial enclosure 702 may include a hollow body 704, a window 706, and a retaining member 708. Body 704 may include a first end 710 and a second end 712, where first end 710 includes a centrally oriented notch 714 extending towards a central axis of body 704, and second end 712 includes a sharp edge 716 around the periphery of second end 712 in a direction opposite to first end 710 along a central axis 720. In this manner, sharp edge 716 is located on an extreme end of body 704 away from first end 710.

Sharp edge 716 defines a cross cut section 718 of body 704 at second end 712 which is preferably normal to central axis 720. Alternatively, the angle of inclination to central axis 720 for the cross cut section may form an angle of up to ±20-degrees from normal in order to provide an oblique angle of insertion upon a planar member. This may have a benefit when the location of components on a board may require partial enclosure 702 be urged against a planar surface (not shown) at other than a substantially normal angle to the planar surface. Further, when the optical device to be enclosed the hermetically sealed enclosure is a camera having a field of view that is not normal to the plane of mounting on the planar surface, it may be necessary or desirable to provide a partial enclosure 702 having a sharpened edge 716 that defines a plane having an elliptical cross section relative to body 704, for example. In this manner, an angled body member 704 may be urged against the planar surface at an angle while forming the hermetically sealed enclosure.

Figure 8:
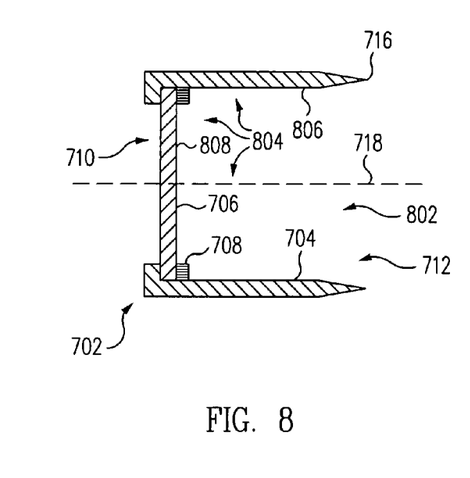
FIG. 8 shows an assembled side view of partial enclosure, in accordance with an embodiment of the present invention.
Figure 9:
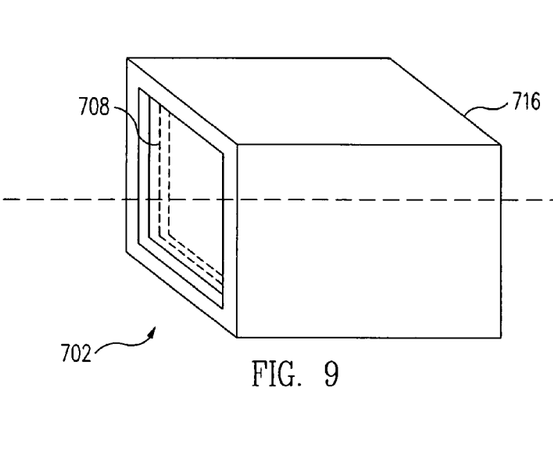
FIG. 9 shows an assembled side perspective view of the partial enclosure of FIGS. 7-8, in accordance with an embodiment of the present invention.

FIG. 8 shows an assembled side view of partial enclosure 702, in accordance with an embodiment of the present invention. Window 706 may be inserted within body 704 in a direction from second end 712 to first end 710 until a portion of window 706 makes contact with notch 714. After this, a retaining member 708 may be inserted within body 704 in a direction from second end 712 to first end 710 until a portion of retaining member 708 makes contact with a portion of window 706. In this manner, window 706 and retaining member 708 may be urged against notch 714 until a hermetic seal is formed at body 704 first end 710, creating a partial enclosure 702 having a transparent portion at first end 710 and an opening only at second end 712. Although retaining member 708 may hold window 706 in place, the hermetic seal between window 706 and first end 710 is formed by brazing or welding. In one embodiment, window 706 may be constructed from glass, quartz, or crystal and conformed to fit the cross section of body 704. Partial enclosure 702 defines a partial enclosure interior region 802 with a plurality of interior surfaces 804 including a hollow body interior surface 806 and a window interior surface 808. The junctions between these surfaces are sealed to provide a partial enclosure 702 that may be placed over an optical device mounted on a planar surface and then urged against the planar surface to form a hermetically sealed enclosure for the optical device. Retaining member 708 may be a rubberized ring-shaped device having an outside diameter slightly larger than the inside diameter of body 704 so that retaining member 708 may be compressed and/or slid into position to both retain window 706 in position against first end 710. Once a hermetic seal is formed between window 706 and first end 710, retaining member 708 may be removed. FIG. 9 shows an assembled side perspective view of the partial enclosure 702 of FIGS. 7-8, in accordance with an embodiment of the present invention.

Figure 10:
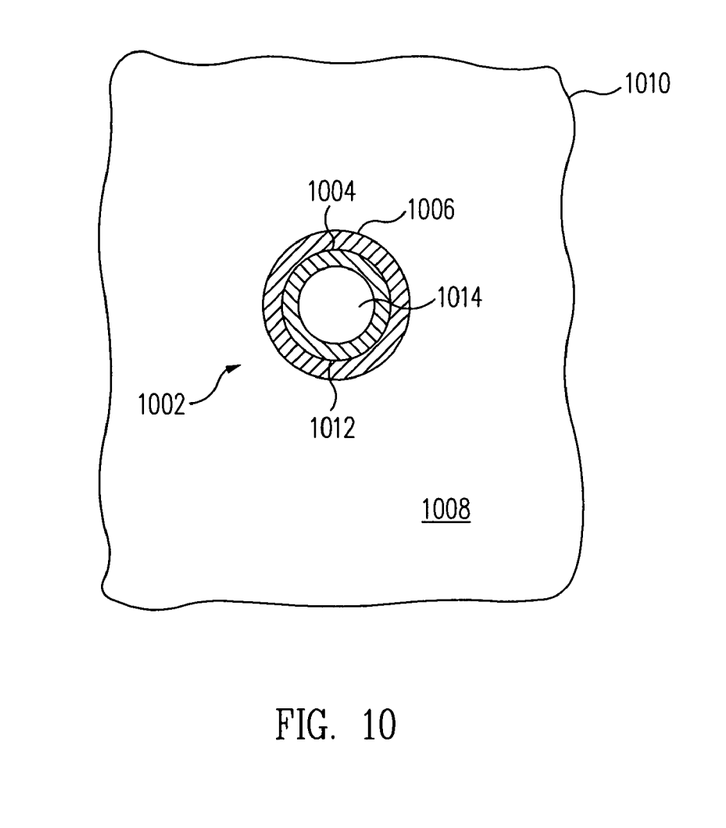
FIG. 10 shows a plan view of a hermetically sealed enclosure having a circular cross-section, according to an embodiment of the present invention.

FIG. 10 shows a plan view of a hermetically sealed enclosure 1002 having a circular cross-section, according to an embodiment of the present invention. Enclosure 1002 may be formed by pressing a partial enclosure 1004 against a track 1006 affixed to a surface 1008 of a mounting board 1010. Partial enclosure 1004 may include a hollow body 1012 and a window 1014 configured to pass or transmit light.

Figure 11:
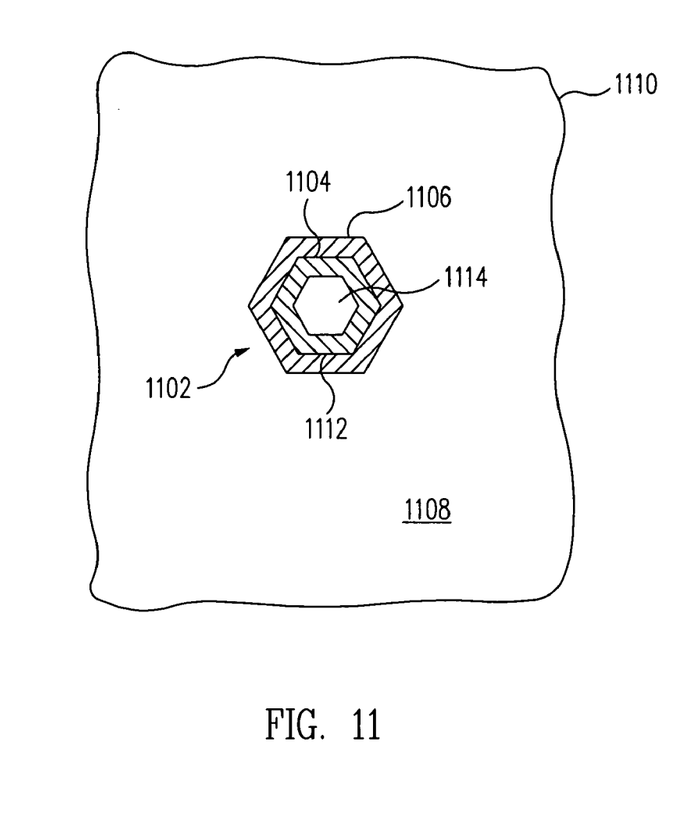
FIG. 11 shows a plan view of a hermetically sealed enclosure having a hexagonal cross section, according to an embodiment of the present invention.

FIG. 11 shows a plan view of a hermetically sealed enclosure 1102 having a hexagonal cross section, according to an embodiment of the present invention. Enclosure 1102 may be formed by pressing a partial enclosure 1104 against a track 1106 affixed to a surface 1108 of a mounting board 1110. Partial enclosure 1104 may include a hollow body 1112 and a window 1114 configured to pass or transmit light. Enclosure 1104 may have a cross section corresponding to any polygonal shape. Although shown as having a regular cross section, enclosure 1102 may alternatively include an elongated axis so that the polygonal shape is irregular, or not regular.

Figure 12:
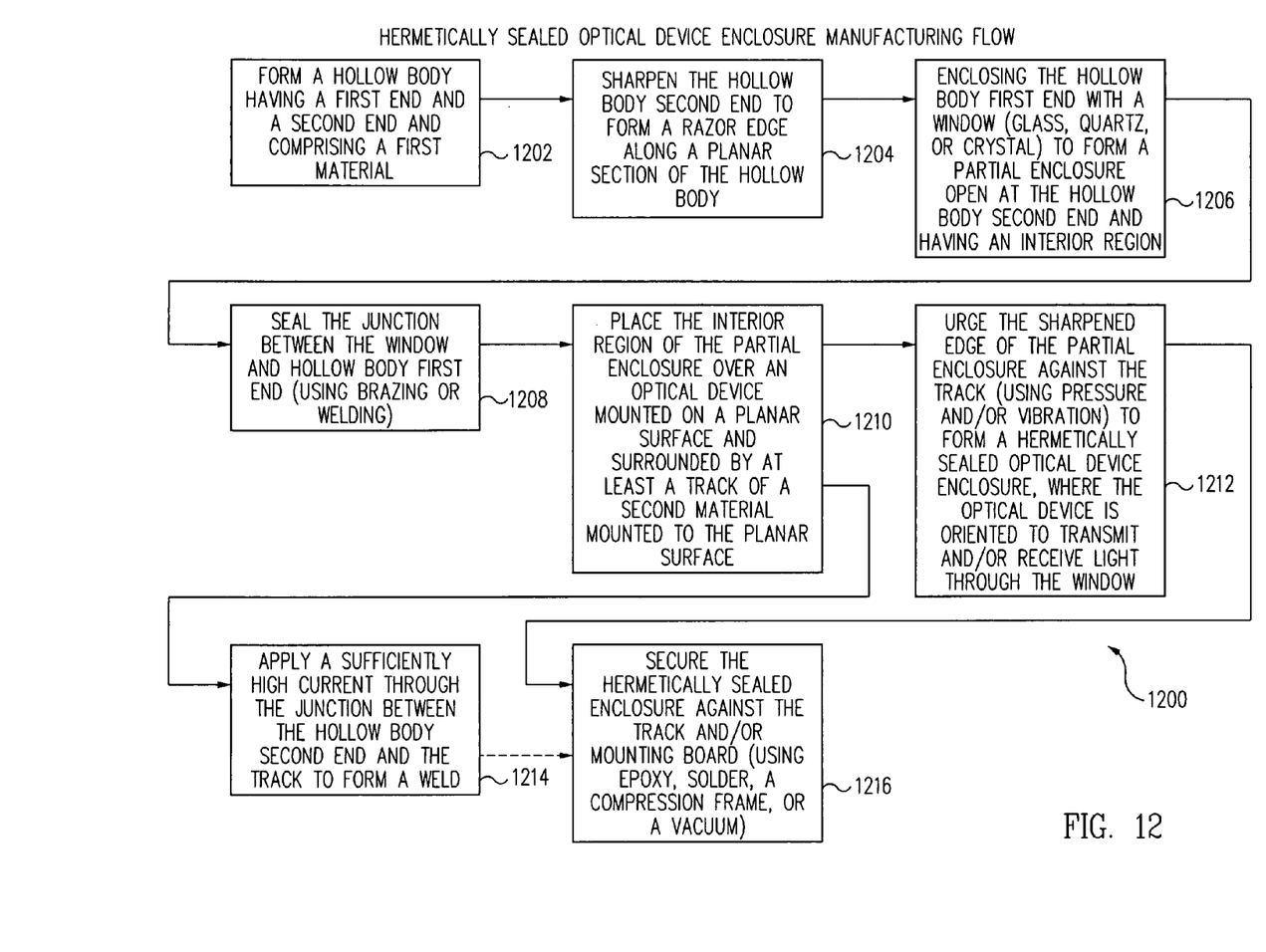
FIG. 12 shows an exemplary hermetically sealed optical device enclosure manufacturing flow, in accordance with an embodiment of the present invention.

FIG. 12 shows an exemplary hermetically sealed optical device enclosure manufacturing flow 1200, in accordance with an embodiment of the present invention. Flow 1200 may include forming a hollow body having openings on a first end and a second end, where the hollow body comprising a first material in operation 1202. Flow 1200 continues with sharpening the hollow body second end to form a razor edge along a planar section of the hollow body in operation 1204. Alternatively, the material comprising the hollow body may include a sharpened edge prior to forming into a hollow body shape having a first end and a second end. In this case, the sharpened edge would form the second end, as described. Flow 1200 continues with enclosing the hollow member first end with a window (e.g. glass, quartz, or crystal) to provide a partial enclosure that is open at the hollow body second end in operation 1206, where the partial enclosure has an interior region, the window is configured to provide the transmission of light at least one of into or out of the interior region, and the boundary between the hollow body first end and the window comprising a first junction. Flow 1200 continues with sealing the first junction between the window and the hollow body first end using an effective sealing means including brazing or welding in operation 1208. In this manner, a sealed partial enclosure is formed having an opening at the hollow body second end. Flow 1200 continues with placing the interior region of the partial enclosure over an optical device that is mounted on a planar surface in operation 1210, where the optical device is surrounded by at least a track of a second material (e.g. a soft metal) mounted to the planar surface. After the partial enclosure is arranged in a position circumscribing the optical device on the planar surface, flow 1200 continues with urging the sharpened edge of the partial enclosure against the track to form a second junction around a portion of the track enclosing a portion of the planar surface adjacent to the optical device in operation 1212, where the window, the hollow body interior surface, an enclosed portion of the track, and an enclosed portion of the planar surface comprise a hermetically sealed optical device enclosure around the optical device.

Optionally, the operation of urging the sharpened edge against the soft metal track may include an agitation action to provide microscopically small relative motion, ultrasonic welding, to provide a more extensive fusion of the hollow body second end sharp edge with the track. Where the hollow body has rotational symmetry along a long axis that is normal to the planar member, the operation of urging the hollow body second edge against the planar member may include rotating the hollow body second end sharp edge around the long axis to provide microscopically small relative rotation movements to provide a more extensive fusion of the hollow body second end sharp edge with the track.

After placing the interior region of the partial enclosure over an optical device mounted on a planar surface in operation 1210, instead of moving to operation 1212, flow 1200 may continue with applying a sufficiently high current through a second junction between the hollow body second end and the metal track to form a weld in operation 1214. In this manner, the hollow body sharp second end sharp edge may contact the metal track either with or without exerting additional force after contact is made. In one example, the sharp edge is merely contacting the metal track when the current is applied. In another example, a combination of urging and welding may be used. In operation 1214, since welding is used to form the hermetic seal, it is not necessary that the metal track be composed of a metal or alloy material that is softer than the hollow body material. Flow 1200 concludes with securing the second junction against rupture by applying a sealing material that may include an epoxy, applying a solder or other relatively low-temperature reflow binding materials, applying a compression frame external to the hermetic enclosure, or instilling a vacuum within the hermetic enclosure, in operation 1216.

Although the invention has been described with respect to particular embodiments, this description is only an example of the invention's application and should not be taken as a limitation. Consequently, the scope of the invention is set forth in the following claims.

I claim:

1. A camera enclosure apparatus, comprising:
a component board having a planar surface;
a camera mounted on the planar surface;
a hollow body comprising one or more walls substantially perpendicular to the component board, an opening on a first end of the hollow body, and an opening on a second end of the hollow body, wherein the one or more walls taper to a sharp edge at a furthermost edge of the second end along a planar section of the hollow body; and
a window enclosing the hollow body first end to provide a partial enclosure that is open at the hollow body second end, the partial enclosure having an interior region configured to surround the camera mounted on the planar surface, the window being configured to provide the transmission of light into the interior region and to the camera, the hollow body second end being configured for urging against the planar surface to press into the planar surface to secure the hollow body to the component board to form a hermetic seal around the camera.

2. The camera enclosure of claim 1, wherein the hollow member material includes metal and comprises an electromagnetic interference (EMI) shield, and wherein the hollow member has one of a substantially circular or polygonal cross section, and wherein the planar surface material includes ceramic and at least a track of a soft metal surrounding the camera that may be deformed by the urging of the hollow body second end against the planar surface.

3. The camera enclosure of claim 1, wherein the window material is selected from the group consisting of glass, quartz, and crystal.

4. An apparatus, comprising:

a camera;

a component board having a first planar surface, the component board being configured to receive the camera mounted on the first planar surface and surrounded by at least a track of a first material affixed to the first planar surface, the first material having a first hardness;

a hollow body member comprising one or more walls substantially perpendicular to the component board, an opening on a first end of the hollow body, and an opening on a second end of the hollow body, wherein the one or more walls taper to a sharp edge along a planar section at a furthermost edge of the second end of the hollow body, the hollow body comprising a second material with a second hardness, the second hardness being equal to or greater than the first hardness; and a window member enclosing the hollow body first end to provide, a partial enclosure having an enclosed interior region configured to surround the camera, the window providing the transmission of light at least one of into or out of the interior region, the hollow body second end being urged against the first material on the component board to press into the track to secure the hollow body to the component board to form a hermetically sealed enclosure around the camera.

5. The apparatus of claim 4, wherein the hollow body has a circular cross section.

6. The apparatus of claim 4, wherein the hollow body has a polygonal cross section.

7. The apparatus of claim 4, wherein the first material and the second material are the same material with the same hardness.

8. The apparatus of claim 4, wherein the window is a substantially transparent member selected from the group consisting of a window having substantially parallel and substantially planar surfaces, a prism having substantially planar non-parallel surfaces, and a lens having at least one curved non-planar surface.

9. The apparatus of claim 4, wherein the hermetically sealed enclosure around the camera contains an inert gas selected from the group consisting of argon, helium, neon, and xenon.

10. The apparatus of claim 4, wherein the hermetically sealed enclosure interior region around the camera is evacuated.

* * * * *